(12) United States Patent
Haddad et al.

(10) Patent No.: US 11,909,888 B2
(45) Date of Patent: Feb. 20, 2024

(54) SHARED ECOSYSTEM FOR ELECTRONIC DOCUMENT SIGNING AND SHARING (DSS)

(71) Applicant: Bank of America Corporation, Charlotte, NC (US)

(72) Inventors: Linda Haddad, Concord, CA (US); Denise D. Marcus, Mooresville, NC (US); Kamesh R. Gottumukkala, Fremont, CA (US)

(73) Assignee: Bank of America Corporation, Charlotte, NC (US)

( * ) Notice: Subject to any disclaimer, the term of this patent is extended or adjusted under 35 U.S.C. 154(b) by 98 days.

(21) Appl. No.: 17/465,976

(22) Filed: Sep. 3, 2021

(65) Prior Publication Data
US 2021/0399902 A1 Dec. 23, 2021

Related U.S. Application Data

(63) Continuation of application No. 16/272,026, filed on Feb. 11, 2019, now Pat. No. 11,146,404.
(Continued)

(51) Int. Cl.
*H04L 29/06* (2006.01)
*H04L 9/32* (2006.01)
(Continued)

(52) U.S. Cl.
CPC ........ *H04L 9/3247* (2013.01); *G06F 21/6218* (2013.01); *G06F 40/186* (2020.01);
(Continued)

(58) Field of Classification Search
CPC ............... G06F 21/6218; G06F 40/186; G06F 16/3323; G06F 16/93; G06F 16/986;
(Continued)

(56) References Cited

U.S. PATENT DOCUMENTS 8,103,867 B2  1/2012  Spitz
8,484,723 B2  7/2013  Oswalt
(Continued)

*Primary Examiner* — Wasika Nipa
*Assistant Examiner* — Leynna Truvan
(74) *Attorney, Agent, or Firm* — Weiss & Arons LLP

(57) ABSTRACT

Aspects of the disclosure relate to an electronic document sharing and signing (DSS) ecosystem for electronic document authentication and authorization. The DSS ecosystem may preferably provide a communication platform between a first user information database associated with a first entity and a second user information database associated with a second entity. The DSS ecosystem may include a signer information database. The signer information database may be coupled to the first user information database and the second user information database. The signer information database may be configured to be readable by the first entity and writeable to by the first entity, and readable by the second entity but not writeable to by the second entity. The signer database may include a list of signatory names associated with the first entity, and a plurality of electronically signed documents. Each of the documents may include an electronic signature applied by a signatory whose name appears on the signatory list. The list of electronically signed documents may be accessible by the second entity.

14 Claims, 3 Drawing Sheets

Related U.S. Application Data

(60) Provisional application No. 62/754,639, filed on Nov. 2, 2018.

(51) Int. Cl.
  *H04L 9/14* (2006.01)
  *H04L 9/40* (2022.01)
  *G06F 40/186* (2020.01)
  *G06F 21/62* (2013.01)

(52) U.S. Cl.
  CPC .............. *H04L 9/14* (2013.01); *H04L 9/3255* (2013.01); *H04L 63/101* (2013.01)

(58) Field of Classification Search
  CPC .... G06F 17/30011; H04L 9/3247; H04L 9/14; H04L 9/3255; H04L 63/101; H04L 2209/72; H04N 1/00355; G07B 2017/00766; G06V 40/33; H04M 2203/058; G07C 9/35
  See application file for complete search history.

(56) References Cited

U.S. PATENT DOCUMENTS

| | | |
|---|---|---|
| 8,819,813 B2 | 8/2014 | Oswalt |
| 8,874,923 B2 | 10/2014 | Foygel |
| 9,178,707 B2 | 11/2015 | Foygel |
| 9,313,032 B2 | 4/2016 | Oswalt |
| 9,325,508 B2 | 4/2016 | Oswalt |
| 9,350,554 B2 | 5/2016 | Oswalt |
| 9,350,555 B2 | 5/2016 | Oswalt |
| 9,594,739 B2 | 3/2017 | Dunn et al. |
| 9,634,975 B2 | 4/2017 | McCabe et al. |
| 9,853,818 B2 | 12/2017 | Oswalt |
| 9,882,725 B2 | 1/2018 | Foygel |
| 9,984,242 B2 | 5/2018 | Follis |
| 11,068,644 B1 | 7/2021 | Beiderman et al. |
| 2013/0198038 A1* | 8/2013 | Mowatt .................. G06Q 10/10 726/28 |
| 2015/0213568 A1 | 7/2015 | Follis et al. |
| 2018/0239959 A1* | 8/2018 | Bui ........................ G06Q 10/10 |

\* cited by examiner

100 →

Checklist for using your D.S.S. account with Cooperating Entity for Treasury documents 102 → Requirements to submit documents using D.S.S.
- ☐ An Active D.S.S. account
- ☐ Documents and letters of instruction must be for US accounts and/or US relationships
- ☐ Set up each of your signer profiles to include name, title, and uploaded image of signature specimen
- ☐ Work with Cooperating Entity contact to effect a test message 104 → Preparing the document for delivery to Cooperating Entity
- ☐ Prepare your documents or letters, load to D.S.S., and add field tags for your signer(s)
- ☐ From the Actions Dropdown list within D.S.S, use Edit Recipients to add Cooperating Entity as a CC Receives a Copy recipient
- ☐ Select Set Signing Order to ensure your document is only delivered to Cooperating Entity after fully executed
- ☐ Make Cooperating Entity last in the order, and use your dedicated Cooperating Entity group mailbox email address for delivery. Ask your Cooperating Entity representative if you are unsure of this address ☑ Set signing order

| 1 | Authorized Signer | NEEDS TO SIGN ▽ MORE ▽ |
| | Signer@company.com | |

| 2 | Cooperating Entity | CC RECEIVES A COPY ▽ MORE ▽ |
| | Dedicatedmwtwo@ce.com | |

- ☐ From the Actions Dropdown list within D.S.S., use Edit Message to add your company name and D.S.S. envelope ID to subject line on each request; [[SenderCompany]], [[Envelope ID]] then send your documents. Cooperating Entity will receive the final executed copy directly from D.S.S., saving you the added step of saving and attaching to an email.

106 → Message to All Recipients
- ☐ Custom email and language for recipient

[[SenderCompany]], [[EnvelopeID]], Please review

Documents for Electronic Signature

FIG. 1

SHARED ECOSYSTEM FOR ELECTRONIC DOCUMENT SIGNING AND SHARING (DSS)

CROSS REFERENCE TO RELATED APPLICATION

This application is a continuation of U.S. patent application Ser. No. 16/272,026 filed on Feb. 11, 2019, and entitled "SHARED ECOSYSTEM FOR ELECTRONIC DOCUMENT SIGNING AND SHARING (DSS)," which is a non-provisional of U.S. Provisional Patent Application No. 62/754,639, entitled, "SHARED ECOSYSTEM FOR ELECTRONIC DOCUMENT SIGNING AND SHARING (DSS)," filed on Nov. 2, 2018.

FIELD OF TECHNOLOGY

Aspects of the disclosure relate to electronic document sharing and signing. Specifically, aspects of the disclosure relate to an ecosystem for electronic document sharing and signing. For the purposes of this application, the term "document" or "document(s)" referred to herein should be understood to refer to electronic documents. The terms "sharing" and "signing" referred to herein refer to the electronic sharing and electronic signing of electronic documents.

BACKGROUND OF THE DISCLOSURE

Corporate entities have a need to exchange documents and agreements with each other. In some situations, two cooperating entities do not necessarily know each other's signatory requirements or internal policies regarding same. In other situations, two cooperating entities may know each other's signatory requirements or internal policies regarding same. In yet other situations, one of two cooperating entities may know the other's signatory requirements or internal policies. As necessary, these entities have to manually share expectations and hope the other party follows their respective rules.

Often a corporate entity faces difficulties with a document signature system. For example, maintaining an authorized signer database can be difficult and may take long periods of time to update. An entity's workflow is neither connected nor necessarily aligned with other entities—even with entities with which the corporate entity is cooperating. Such a non-aligned workflow may be non-aligned because of dual signer policies, limits associated with certain signers, etc.

In addition, a corporate entity may require immediate/ real-time changes to their document signature system in order to prevent fraud. Such immediate/real-time changes may be difficult to communicate in a timely fashion to a cooperative entity. Also, the visibility and/or status tracking of submitted documentation may not always be available or consistent within the corporate entity or at a second, cooperative entity. Furthermore, which documents or versions are signed between cooperating entities may be unknown.

In addition, a cooperating entity may be responsible for maintaining corporate-entity-client authorized signer lists but clients do not always let the cooperating entity know about changes to such lists. And, as mentioned above, there may be workflow divergence between a corporate entity and a cooperating entity. For example, a corporate entity may require a change put through the system immediately, but the cooperating entity may be working on multiple-day service level agreement. As such, the cooperating entity may only be scheduled, and/or expected, to put through such a change over a multiple-day interval instead of immediately.

Typically, corporate entities need to control the individuals authorized to sign on behalf of the entity. Corporate entities also want to be able to access, and, when necessary, change their list of authorized signers. In addition, corporate entities need to be able to require that signers conform to internal policy and directives. Also—corporate entities often demand additional visibility into status of submitted documentation related to requests.

Counterparts to the corporate entities may be recipients of electronically-signed documents from, or may exchange electronically-signed documents with, the corporate entity. Such counterparts may also have various needs related to document sharing and signing.

For example, counterparts want less responsibility and liability related to managing corporate authorized signers. Counterparts also want to reduce special handling and to reduce non-standard processes. Counterparts want clients to have access to current versions of documents and related templates for use in producing such documents. Counterparts also want to have a trusted authentication process. In addition, counterparts want to standardize sharing of documents with corporate entities.

Accordingly, it would be desirable to provide a shared ecosystem for electronic document signing and sharing (DSS). It would be additionally desirable to present a shared ecosystem for use by corporate entities and their respective counterparts.

SUMMARY OF THE DISCLOSURE

Aspects of the disclosure relate to an electronic document sharing and signing (DSS) ecosystem for use in document authentication and authorization. The ecosystem may provide a platform for communication between a first entity and a second entity. The DSS ecosystem may include a first user information database associated with the first entity and a second user information database associated with the second entity.

The ecosystem may also include a signer information database. The signer information database may be coupled to the first user information database and the second user information database.

The signer information database may be configured to be readable from by the first entity and writeable to by the first entity. In some embodiments, the signer information database may be readable from by the second entity but not necessarily writeable to by the second entity.

The signer database may include a list of signatory names associated with the first entity. The signer database may include may also include a plurality of electronically signed documents. Each of the documents may include an electronic signature applied by a signatory whose name appears on the signatory list. Each of the electronically signed documents may preferably be accessible by the second entity.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 1 shows an illustrative checklist in accordance with principles of the disclosure;

DETAILED DESCRIPTION OF THE DISCLOSURE

Figure 2:
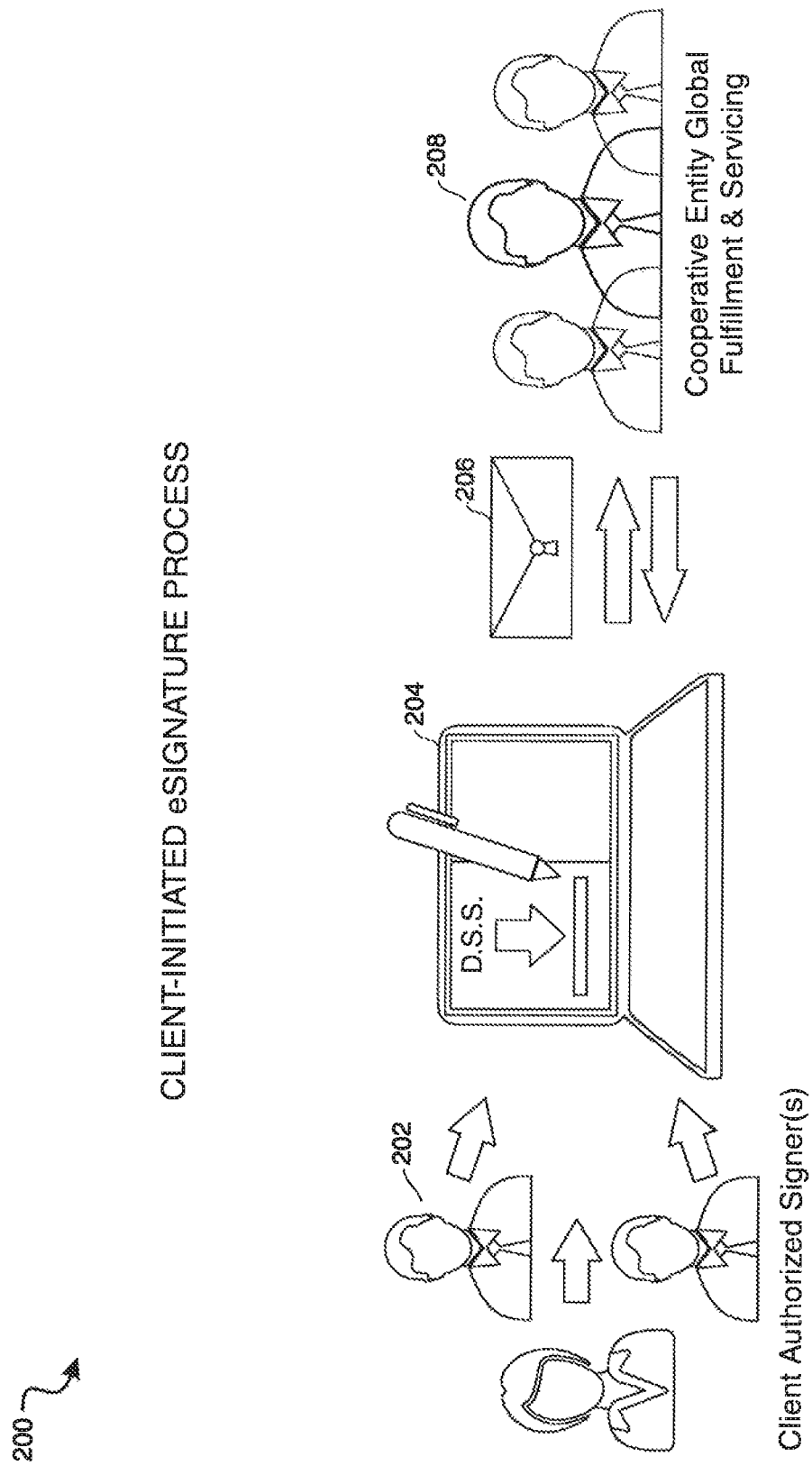
FIG. 2 shows a schematic illustration of an hybrid method/system in accordance with principles of the disclosure.

Aspects of the disclosure relate to a shared ecosystem for authorizing and authenticating systems. Such a shared ecosystem may be referred to herein, in the alternative, as a Document Signing and Sharing system (DSS). This ecosystem provides a platform for the exchange of documents between corporate entities and counterparts.

Such an environment preferably provides shared visibility and control of processes. In addition, such an environment also enables entitlement and status reporting. In addition, such an environment may also ensure consistent application of signer authorizations.

In certain embodiments, an environment may be configured to support enforcement of each side's process policies. Such policies may enable creation of workflow rules based on sender-side directives. Further such policies may provide visibility on the receiver-side of such directives. This visibility may allow the receiver-side to anticipate receipt of sender-side communications.

In some embodiments, an environment may create and/or implement a standard configuration of application settings dictated by agreement between sender and receiver. Preferably, all of the foregoing obtains a secure, reliable and globally-accepted authentication.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

A method for providing an electronic document sharing and signing (DSS) ecosystem according to the disclosure may include transmitting a first selectable link to a first entity. The link may enable the first entity to select to participate in the DSS ecosystem with a second entity.

The method may further include transmitting a second selectable link to the first entity. The second selectable link may preferably enable the first entity to select to update a DSS ecosystem account with settings and document templates associated with the second entity. Such settings may include settings related to approver-limits, dual signer rules, document formatting or any other suitable settings and/or templates that may involve and/or affect electronically-signable document transfer.

In certain embodiments, the first entity may exchange documents with one or more counterpart entities. In such embodiments, each of the other counterpart entities may have unique, or partially unique, settings and document templates. Accordingly, it would be preferably if the DSS ecosystem stored a plurality of settings and document templates.

Each of the settings and document templates is preferably unique to each of the various counterpart entities. In certain embodiments, each of the settings and document templates may be the same for the first entity but different for each of the counterpart entities. In such a system, each counterpart entity may be required to confirm its' documents and settings to the first entity's documents and settings.

In response to a communication generated by the first entity—e.g., transmission of an electronically signed document—the DSS ecosystem preferably deploys the unique settings and document templates associated with the cooperating entity with which the first entity is communicating. Such deployment may occur before or after the document is signed. To the extent that the deployment is occurring after the document is signed, it should be noted that the substance of the document should preferably remain the same, although the document settings and templates may change.

Such a deployment may be a complete deployment of all the unique settings and document templates associated with the cooperating entity. Alternatively, such a deployment may only be limited to the transmission of the electronically-signed document. But, the other unique settings and document templates associated with the cooperating entity may be temporarily maintained in a default, or other, setting at the first entity.

In response to a selection by the first entity to update its DSS ecosystem account with settings and document templates associated with the second entity, the method may also include downloading settings and document templates associated with the second entity to the first entity's DSS ecosystem account. Alternatively, the method may include directly downloading settings and document templates from the second entity system to the first entity system—thereby bypassing the DSS ecosystem.

In addition, the method may include using the DSS ecosystem to open a transmission path to the second entity for receipt of electronically-signed documents transmitted by the first entity. This transmission path may require, as a condition for a successful transmission, that the electronically-signed documents transmitted by the first entity confirm to and/or utilize the downloaded settings and templates.

The method may further include receiving a test signed electronic document from the first entity and transmitting said test signed electronic document to said second entity.

In addition, the method may regulate controlling access to the DSS ecosystem using a series of keys. Each of the parties involved in the DSS ecosystem may be assigned a distinct key for accessing the DSS ecosystem.

In certain embodiments, the DSS ecosystem may be configured to receive at least one electronic document for signature from the second entity and transmit the electronic document to the first entity for signature. Such transmission, however, may require, in order to protect the format of the electronic document, that the first entity conform to and/or utilize the downloaded settings and templates associated with and/or provided by the second entity. This ensures that the transmitting electronic document corresponds, upon e-signature, to the settings and templates of the second entity.

In some embodiments, the DSS ecosystem may also include an Application Programming Interface (API) accessible by each of the first entity and the second entity. The API may preferably be invoked to promote suitable and complementary communication between the first entity and the cooperating entity. The DSS ecosystem may serve as a communications bridge, via the APIs, between the first entity and the second entity, or one or more other cooperating entities.

Specifics of a shared ecosystem according to certain embodiments follow. The embodiments are described in conjunction with FIGS. 1-3.

FIG. 1 shows a preferably client-initiated eSignature checklist 100 for use with certain embodiments. In certain embodiments, such a checklist may be complemented by an API. The API preferably enables clients to auto-adjust their respective DSS account settings and template for sending electronic documents to a cooperative entity.

A corporate client may be provided with such a checklist, as shown in FIG. 1. The checklist preferably outlines the actions a corporate client takes in order to initiate a signed-document exchange with a cooperative entity. Such actions enable the corporate entity to participate in a DSS ecosystem as set forth herein.

The client-initiated eSignature checklist 100 preferably includes at least two sections—1) Requirements to submit using a DSS 102 and 2) Preparing documents for delivery to the cooperative entity 104. The client-initiated eSignature checklist 100 may, in certain embodiments, further include a message to all recipients 106.

Requirements to submit using a DSS 102 preferably detail that a user needs an active DSS account; documents and letters of instruction for United States (US) accounts and/or US relationships; and details of signer profiles such as name title, and uploaded image of signature specimen, and the ability to work with a cooperating entity to effect a test message.

Preparing documents for delivery to the cooperative entity 104 may include the following instructions. The instructions may include preparing documents or letters, loading such letters to DSS, and adding field tags for signers. Field tags for signers can be specified in one of two ways: 1) Passing the explicit x/y coordinates of each tab in the xml when creating the Envelope. This is appropriate for documents with a standard format, where the signature lines and/or other data items collected by the tabs are always located in the same place on the document. In this scenario, the xml request describes where to locate the tabs. 2) Specifying "anchor" strings that exist in the document, against which the tabs should be placed. This is appropriate for documents that have variable content/format, where the tab locations must similarly vary. In this scenario, the xml request describes how to locate such tabs.

In addition, the instructions may include the ability to edit recipients to add a cooperative entity as a "cc receives a copy" recipient. Also, the instructions may include selecting a "set signing order" to ensure the document is only delivered to a cooperative entity after the document has been fully executed. Finally, the instructions may include directing the cooperative entity to be the last address in the order, and using a dedicated cooperative entity group e-mail address for delivery.

In certain embodiments, the instructions may further direct the user to use "Edit Message" to add to the company name and DSS envelope ID to configure the subject line of each request, and then to send the document. The cooperative entity may then receive the final executed copy directly from DSS, saving the added step of saving the document and attaching it to the e-mail for transmission to the cooperative entity.

FIG. 2 shows a preferably client-initiated eSignature Process 200. One or more client-based, authorized, signatories 202 are shown. It should be noted that while signatories 202 are authorized, they still require authentication at the time of applying their signatures. Thus, in order to electronically sign a document, a signatory 202 must preferably authenticate his identity to the system. Such authentication may involve using one or more password(s), biometric authentication, a combination of two or more of the foregoing, or any other suitable authentication.

The DSS 204 may preferably include the list of authorized signers shown at 202. Thereafter, electronically signed documents 206 may preferably be received by, and/or exchanged with, the cooperative entity at 208.

Figure 3:
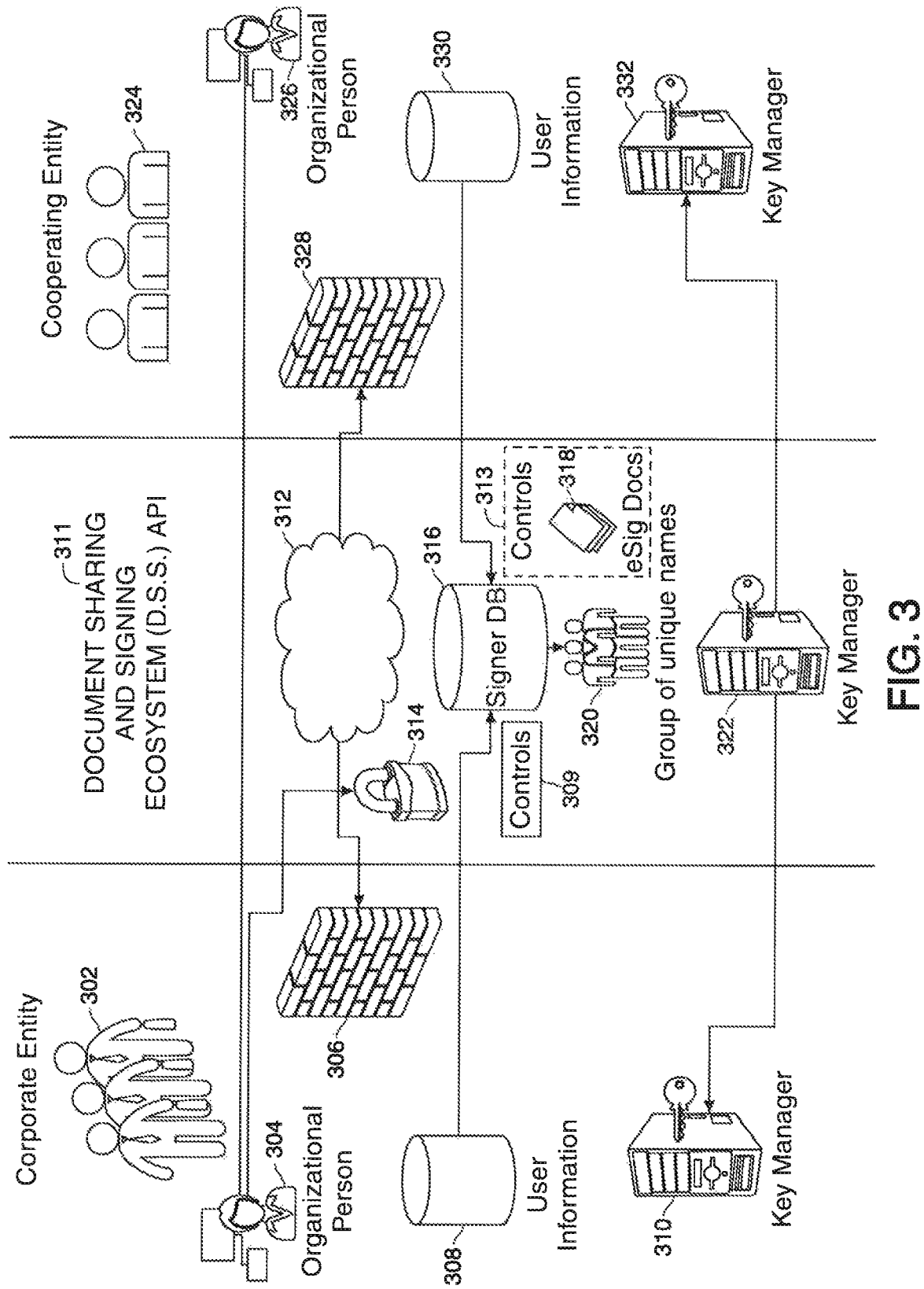
FIG. 3 shows a schematic illustration of a Document Signing and Sharing system (DSS) ecosystem in accordance with principles of the disclosure.

FIG. 3 shows an illustrative architecture of an ecosystem according to certain embodiments. The corporate entity is shown at 302. A cooperating entity is shown at 324.

Corporate entity 302 may include an organizational person 304. Corporate entity 302 may also include firewall 306. Corporate entity 302 may also include user information 308 and a key manager 310. User information 308 may include controls 309.

The DSS may, in certain embodiments also include controls 313 provided by the business.

Organizational person 304 may preferably be a corporate entity assignee responsible for directing the electronic signing and sharing.

Firewall 306 may preferably protect corporate entity 302 from any malware or other damaging information being transmitted through cloud 312.

DSS 311 may access cloud 312. Organizational person 304 may also control a lock 314 located in DSS. Lock 314 may preferably govern access from corporate entity 302 to cloud 312. It should be noted that, in certain embodiments, DSS may take the form of, or include, an Application Program Interface (API).

DSS may include a signer database 316. Authorized signers 320 are shown schematically. Electronically-signable documents are shown schematically at 318.

Signer database 316 may include one of several configurations. For example, in certain embodiments, signer database 316 may be read from or written to by both entity 302 and entity 324.

In some embodiments, signer database 316 may be read from or written to by entity 302 and only read from by entity 324. In such embodiments, entity 302 may preferably entrust entity 324 with knowledge of its signer database 316, but maintain complete control of the contents and authorizations of signer database 316.

Such a configuration—i.e., wherein database 316 may be read from or written to by entity 302 and only read from by entity 324—may enable the transmission of electronically signed documents 318 from entity 302 to entity 324. Thereafter, entity 324 may verify the electronic signatures—using access to database 316.

It should be noted that preferably all of the embodiments disclosed herein enable entity 324 to access the database. Thus, all the embodiments enable entity 324 to process, preferably, substantially independently of interaction—i.e., with straight through processing—with the entity 302, all electronically signed documents.

It should be noted further that preferably all of the embodiments disclosed herein require that each of entity 302 and entity 324 are accessible only by a suitable software key. Such software keys may be in the possession of key managers shown schematically at 310, 322 and 332.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for providing a shared ecosystem for document authentication and authorization are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing an electronic document sharing and signing (DSS) ecosystem for electronic document authentication and authorization, the DSS ecosystem being a communication platform between a first user information database associated with a first entity and a second user information database associated with a second entity, said method comprising:
   coupling a signer information database to the first user information database and the second user information database, said signer information database configured to be readable from by the first entity and writeable to by the first entity, and readable from by the second entity;
   in response to a selection by the first entity to update a DSS ecosystem account with a group of settings and document templates associated with the second entity, downloading the group of settings and document templates associated with the second entity to the first entity's DSS ecosystem account, wherein the group of settings and document templates specifies a plurality of approver-limits, at least one dual signer rule, and a plurality of document formats associated with the second entity;
   wherein the signer database comprises a list of signatory names associated with the first entity, and a plurality of electronically signed documents, each of said documents that comprises an electronic signature applied by a signatory to a location on each of the documents that corresponds to a predetermined field tab, said signatory whose name appears on the signatory list, said list of electronically signed documents that is accessible by said second entity,
   receiving a test signed electronic document from the first entity and transmit said test signed electronic document to said second entity;
   transmitting a first selectable link to the first entity, the first link for enabling the first entity to select to participate in the DSS ecosystem with the second entity;
   transmitting a second selectable link to the first entity, the second link for enabling the first entity to select to update the DSS ecosystem account with the group of settings and document templates associated with the second entity; and
   using the DSS ecosystem to open a transmission path to the second entity for receipt of electronically signed documents transmitted by the first entity.

2. The method of claim 1, wherein the DSS ecosystem is accessible by the first entity using a first key.

3. The method of claim 1, wherein the DSS ecosystem is accessible by the second entity using a second key.

4. The method of claim 1, wherein the DSS ecosystem is internally accessible using a third key.

5. The method of claim 1, wherein the signer information database is writeable to by the second entity.

6. The method of claim 1, wherein the DSS ecosystem is configured to receive at least one electronic document for signature from the second entity and transmit the at least one electronic document for signature by the first entity.

7. The method of claim 1, wherein the DSS ecosystem further comprises a discrete Application Programming Interface accessible by, and for communication with, each of the first entity and the second entity.

8. The method of claim 1, wherein the predetermined field tab is located in a fixed location across all of the documents.

9. A method for providing an electronic document sharing and signing (DSS) ecosystem for electronic document authentication and authorization, the DSS ecosystem being a communication platform between a first user information database associated with a first entity and a second user information database associated with a second entity, said method comprising:
   coupling a signer information database to the first user information database and the second user information database, said signer information database configured to be readable from by the first entity and writeable to by the first entity, and readable from by the second entity;
   in response to a selection by the first entity to update a DSS ecosystem account with a group of settings and document templates associated with the second entity, downloading the group of settings and document templates associated with the second entity to the first entity's DSS ecosystem account, wherein the group of settings and document templates specifies a plurality of approver-limits, at least one dual signer rule, and a plurality of document formats associated with the second entity;
   wherein the signer database comprises a list of signatory names associated with the first entity, and a plurality of electronically signed documents, each of said documents that comprises an electronic signature applied by a signatory whose name appears on the signatory list, said list of electronically signed documents that is accessible by said second entity;
   receiving a test signed electronic document from the first entity and transmit said test signed electronic document to said second entity;

transmitting a first selectable link to the first entity, the first link for enabling the first entity to select to participate in the DSS ecosystem with the second entity;

transmitting a second selectable link to the first entity, the second link for enabling the first entity to select to update the DSS ecosystem account with the group of settings and document templates associated with the second entity; and using the DSS ecosystem to open a transmission path to the second entity for receipt of electronically signed documents transmitted by the first entity.

10. The method of claim 9, wherein the DSS ecosystem is accessible by the first entity using a first key.

11. The method of claim 9, wherein the DSS ecosystem is accessible by the second entity using a second key.

12. The method of claim 9, wherein the DSS ecosystem is internally accessible using a third key.

13. The method of claim 9, wherein the DSS ecosystem is configured to receive at least one electronic document for signature from the second entity and transmit the at least one electronic document for signature by the first entity.

14. The method of claim 9, wherein the DSS ecosystem further comprises an Application Programming Interface accessible by each of the first entity and the second entity.

* * * * *